Feb. 13, 1923.

A. KIRN.
CLOTH CUTTING MACHINE.
FILED JUNE 17, 1919.

Inventor
August Kirn,
By E. Hume Talbert
Attorney

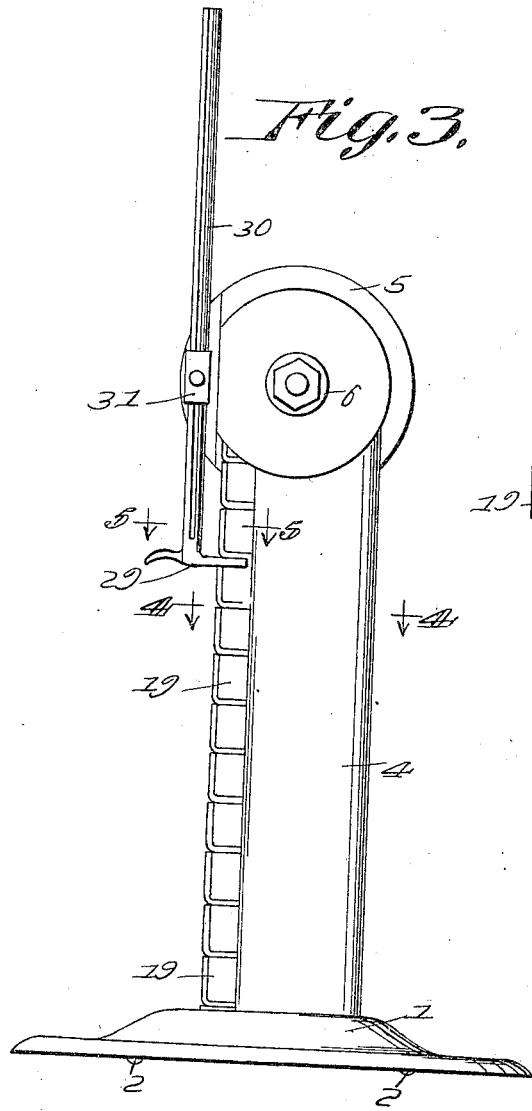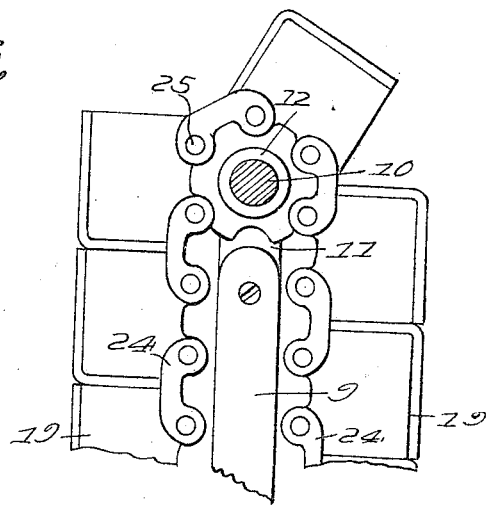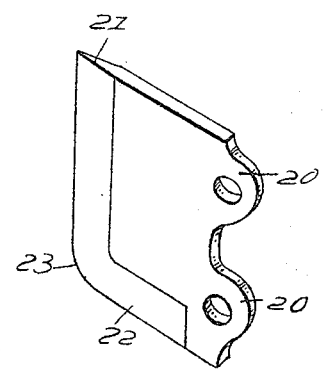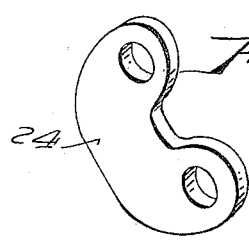

Feb. 13, 1923.
A. KIRN.
CLOTH CUTTING MACHINE.
FILED JUNE 17, 1919.
1,445,325.
3 SHEETS—SHEET 3.
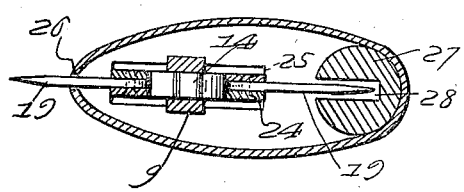
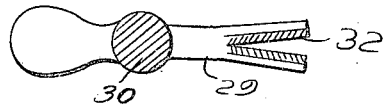
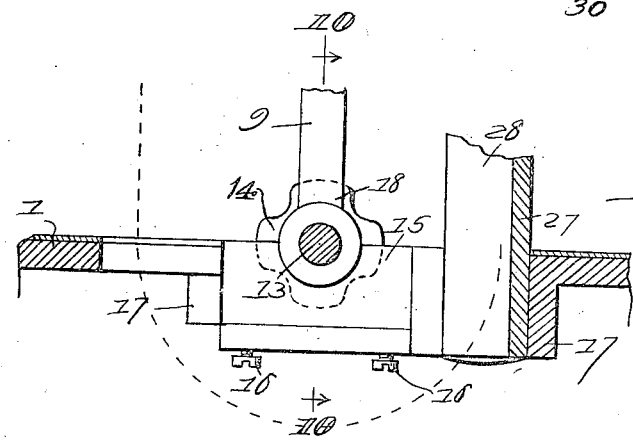
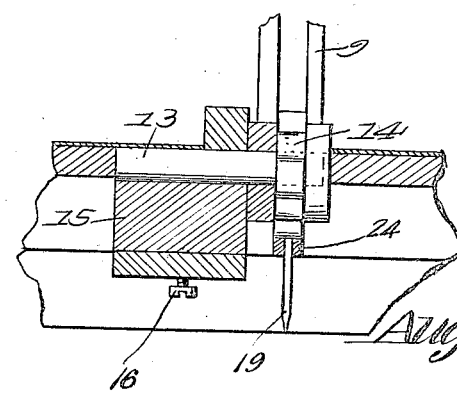
Inventor
August Kirn,
By
Attorney Patented Feb. 13, 1923.

1,445,325

UNITED STATES PATENT OFFICE.

AUGUST KIRN, OF CINCINNATI, OHIO.

CLOTH-CUTTING MACHINE.

Application filed June 17, 1919. Serial No. 304,841.

*To all whom it may concern:*

Be it known that AUGUST KIRN, a citizen of the United States, residing at Cincinnati, in the county of Hamilton and State of Ohio, has invented new and useful Improvements in a Cloth-Cutting Machine, of which the following is a specification.

The object of the invention is to provide a machine for cutting cloth in bulk—that is, for cutting a multiplicity of layers of cloth at one operation. To this end the invention comprises a suitable base mounted on axes or rolls over a cutting table. On this base there is mounted a column in which there is housed a plurality of cutting knives assembled in the form of a chain and driven by an acceptable prime mover. The chain of knives travel down the column on one side and up on the other. The section traveling downward projects from the side of the column so that their cutting edges may engage the cloth to be severed, while the section of knives traveling upward ride in a suitable guide within the column. The provision of a chain like cutting device makes for the ready removal or replacement of any of its damaged elements.

In addition to the cutting knives themselves, the device is provided with an effective sharpening medium by means of which a keen edge is kept on the cutting knives.

A further object of the invention is to provide a cutting machine of the character mentioned which is simple in construction, durable and effective in operation and inexpensive to manufacture.

Other and further objects appear in the following description wherein the invention is set forth in detail.

To the exact construction in which it is shown and described, the invention is not to be restricted. The right is reserved to make such changes or alterations as the actual reduction to practice may suggest, in so far as such changes or alterations are compatible in spirit with the annexed claims.

In the accompanying drawings wherein like numerals of reference designate like parts, Fig. 1 is a view in side elevation of the improved machine.

Fig. 3 is a side elevational view similar to Fig. 1, but looking in a direction at right angles to the direction from which

Fig. 4 is a section on the line 4—4 of Fig. 1.

Fig. 5 is a section on the line 5—5 of Fig. 1.

Fig. 6 is a section on the line 6—6 of Fig. 2.

Fig. 7 is a perspective view of one of the cutting knives.

Fig. 8 is a perspective view of one of the links by means of which the cutting knives are connected together to form the chain like cutting elements.

Fig. 9 is a section on the line 9—9 of Fig. 1.

Fig. 10 is a section on the line 10—10 of Fig. 6.

Figures 1, 2:
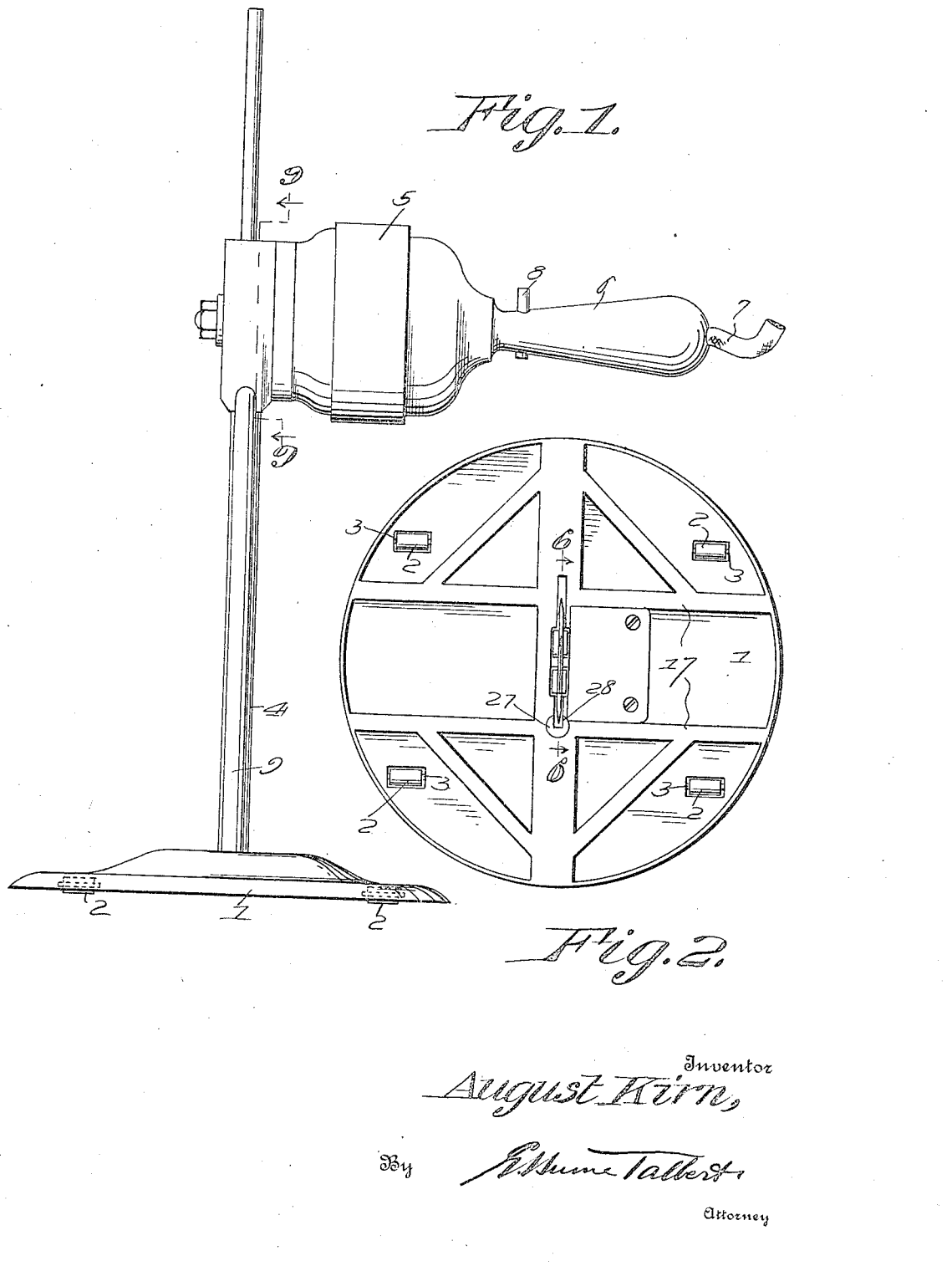
Fig. 2 is a bottom plan view of the structure in Fig. 1.
Fig. 1 is viewed.

Referring to the drawings the invention is shown as comprising a base 1 which is preferably circular in shape, this base carrying the four rolls 2 which are rotatably mounted on appropriate studs or pins 3. The rolls provide for the free movement of the base over a cutting table or other surface whereon the device is used for the cutting of cloth.

Upstanding from the base at the center thereof there is a hollow column 4 which is substantially elliptical in cross section, the minor diameter being much shorter than the major diameter. This column 4 carries at its upper end a motor casing 5 so disposed with reference to the column that the driving shaft of the motor parallels the minor diameter thereof. At the other end of the motor casing there is provided an appropriate handle 6 through which a supply line 7 passes to transmit current to the motor for the driving thereof, a conventional form of push switch 8 being included in the handle for the ready starting and stopping of the motor.

A vertically disposed bar 9 is housed within the column 4 and extends from the base 2 to the top of the column terminating in the vicinity of the motor shaft 10 which latter passes through the bar in which there is formed an appropriate bearing for the motor shaft, this bar 9 at the upper end being opposite from the remainder of the bar, as indicated at 11, so that the sprocket 12 which is carried by the motor shaft 11 may be disposed directly above the main portion of the bar to permit the chain like cutting element of the device to move in substantially the same plane with the main portion of the bar.

A stud 13 is supported in the base 1 for the purpose of carrying a sprocket wheel 14 identical with the sprocket wheel 12. This stud 13 is clamped into position in the base by means of a block 15 through which attaching screws 16 pass and thread into the base, this block being set between the strengthening ribs 17 of the base. The bar 9 adjacent the base, is offset, as indicated at 18, so that the sprocket 14 which the stud 13 carries may align with the sprocket 12.

Traveling over the two sprockets there is the chain like cutting element which is driven by the motor 5 through the latter's turning of the sprocket 12. This chain like cutting element consists of a plurality of knives 19 made substantially rectangular in plane and formed on one edge with two spaced ears 20 and on the edge opposite these ears the knife is beveled, as indicated at 21, to provide a cutting edge. The upper edge of the knife 19 is formed square with the two faces of the knife, but the bottom edge is beveled just as is done at 21 to leave a bottom cutting edge 22, the two cutting edges being blended by the curving of the corner between the two as indicated at 23. The several knives 19 are grouped together in the form of a chain by means of links 24 which in shape simulate that edge of the knives whereon the ears 20 are formed. In connecting adjacent knives together toolings are employed and disposed on either side of the knives, pins 25 passing through the links and through the ears in the knives. By means of this construction the inner edge of the chain like cutting element is made to simulate a roller chain and this cutting element is supported by the sprockets 12 and 14, the former having the driving sprocket and the latter the idler.

The hollow column 4 at one edge is slotted in the direction of its length as indicated at 26 and the downwardly moving portion of the chain like cutting element projects through this slot—that is, the cutting edges of the several knives comprised in the chain project through this slot. Within the column and disposed at that side thereof opposite the slot, there is an upright circular bar 27 in which there is formed a longitudinal slot 28, this slot aligning with the slot 26 and receiving the cutting edges of the knives on that portion of the chain like cutting element moving upward.

The cutting edges themselves do not engage any part of the slot 28 but the side walls of the said slot will abut the side faces of the knives on any tendency to lateral movement thereof. The bar 27, therefore, with its slot 28 serves as a guide to keep the upward moving section of the chain like cutting element aligned with the downward moving section or active section of the said element.

In order to permit the sharpening of the knives 19 a sharpener 29 is provided, this sharpener being carried at the lower end of a rod or bar 30 which is adjustably supported in a bracket 31 carried by the motor casing. The sharpener 29 is formed with the bifurcated end 32 which straddles the cutting edges of the knives and its shaft to conform to the angle of the bevel of the cutting edges, so that the two legs of the bifurcated end may engage the knives on opposite sides of the cutting edge to grind the knives to effect the sharpening of the latter. The sharpener 29 is adjustable vertically because of the adjustment of the rod provided in the bracket or support 31. If the number of layers of cloth being cut makes a thick or high pile the sharpener can be adjusted to a position where the knives pass directly into the cloth after leaving the sharpener. On a low pile composed of a comparatively few layers of cloth the sharpener can be lowered to attain the same relative position to the character of pile that it may have with reference to a thick pile.

In the use of the machine, the cloth to be cut is laid in layers on the cutting table. The base is set under the lowermost layer and when the motor 5 is started by means of the switch 8, the chain like cutting element composed of the knives 19 is set in motion, those knives effecting the cutting operation coming down the table as the motor revolves. The movement of the column through the cloth following the outline of the pattern to be cut is then effected by pressure exerted upon the handle and if need be, on the column, the roller upon which the base is supported permitting the device to be moved freely across the table. The knives traveling the while sever the cloth and the column follows the cut in the cloth made by the knives.

The invention having been described, what is claimed as new and useful is:

A machine of the kind described comprising a base, a hollow column upstanding on the base, the column being formed with a slot at one side, sprocket wheels disposed respectively adjacent the top and at the bottom of the column, a chain like cutting element traversing the sprocket, means for driving one of the sprockets, one section of the chain projecting through the slot formed in the column, a bracket mounted at the upper end of the column, and a sharpener adjustably mounted in the bracket and consisting of a bar slidably engaging the bracket and a bifurcate carried at the lower end of the bar and straddling the chain like cutting element for engagement with the cutting edges of the same.

In testimony whereof he affixes his signature.

AUGUST KIRN.